US008615237B2

(12) United States Patent
Baniel et al.

(10) Patent No.: US 8,615,237 B2
(45) Date of Patent: Dec. 24, 2013

(54) METHODS, SYSTEMS, AND COMPUTER READABLE MEDIA FOR POLICY AND CHARGING RULES FUNCTION (PCRF) NODE SELECTION

(75) Inventors: Uri Baniel, Buffalo Grove, IL (US); Kenneth Charles Jackson, Overland Park, KS (US); Tarek Abou-Assali, Boston, MA (US); Michael Mercurio, Jamaica Plain, MA (US); David Michael Sprague, Raleigh, NC (US)

(73) Assignee: Tekelec, Inc., Morrisville, NC (US)

( * ) Notice: Subject to any disclaimer, the term of this patent is extended or adjusted under 35 U.S.C. 154(b) by 536 days.

(21) Appl. No.: 12/974,869

(22) Filed: Dec. 21, 2010

(65) Prior Publication Data

US 2011/0165901 A1 Jul. 7, 2011

Related U.S. Application Data

(60) Provisional application No. 61/292,062, filed on Jan. 4, 2010, provisional application No. 61/405,629, filed on Oct. 21, 2010.

(51) Int. Cl.
*H04W 4/00* (2009.01)
(52) U.S. Cl.
USPC ....................................... 455/435.2
(58) Field of Classification Search
USPC ....................................... 455/435.2
See application file for complete search history.

(56) References Cited

U.S. PATENT DOCUMENTS 1,872,857 A 4/1931 Wesson et al.
6,298,383 B1 10/2001 Gutman et al.
7,292,592 B2 11/2007 Rune
7,551,926 B2 6/2009 Rune
8,015,293 B2 9/2011 Schaedler et al.
(Continued)

FOREIGN PATENT DOCUMENTS

EP 1 357 720 A1 10/2003
EP 2 242 205 A1 10/2010
(Continued)

OTHER PUBLICATIONS

Notice of Allowance and Fee(s) Due for U.S. Appl. No. 13/366,923 (Jan. 7, 2013).

(Continued)

*Primary Examiner* — Temica M Beamer
*Assistant Examiner* — Joel Ajayi
(74) *Attorney, Agent, or Firm* — Jenkins, Wilson, Taylor & Hunt, P.A.

(57) ABSTRACT

The subject matter described herein includes methods, systems, and computer readable media for PCRF node selection. According to one aspect, a system for PCRF node selection is provided. The system includes a first PCRF selection node for receiving a first request message for which PCRF node selection is required. The first PCRF selection node determines whether to select the PCRF or to delegate selection of the PCRF. In response to a determination to delegate the selection of the PCRF, the first PCRF selection node generates and sends a second request message related to the first request message. The system further includes a second PCRF node for, in response to receiving the second request message from the first PCRF selection node, determining whether to select the PCRF or to delegate selection of the PCRF. In response to determining to select the PCRF, the second PCRF selection node selects the PCRF.

23 Claims, 13 Drawing Sheets

(56) References Cited

U.S. PATENT DOCUMENTS

| | | |
|---|---|---|
| 2002/0147845 A1 | 10/2002 | Sanchez-Herrero |
| 2002/0194378 A1 | 12/2002 | Foti |
| 2002/0196775 A1 | 12/2002 | Tuohino et al. |
| 2003/0040280 A1 | 2/2003 | Koskelainen |
| 2003/0131151 A1 | 7/2003 | Roach et al. |
| 2004/0103157 A1 | 5/2004 | Requena et al. |
| 2004/0152469 A1 | 8/2004 | Yla-Outinen et al. |
| 2004/0205212 A1 | 10/2004 | Huotari et al. |
| 2004/0223489 A1 | 11/2004 | Rotsten et al. |
| 2004/0225878 A1 | 11/2004 | Costa-Requena et al. |
| 2004/0246965 A1 | 12/2004 | Westman et al. |
| 2005/0007984 A1 | 1/2005 | Shaheen et al. |
| 2005/0058125 A1 | 3/2005 | Mutikainen et al. |
| 2005/0078642 A1 | 4/2005 | Mayer et al. |
| 2005/0094594 A1 | 5/2005 | Roh |
| 2005/0124341 A1 | 6/2005 | Myllymaki et al. |
| 2005/0155036 A1 | 7/2005 | Tiainen et al. |
| 2005/0159156 A1 | 7/2005 | Bajko et al. |
| 2005/0235000 A1 | 10/2005 | Keil |
| 2006/0030320 A1 | 2/2006 | Tammi et al. |
| 2006/0045249 A1 | 3/2006 | Li et al. |
| 2006/0068816 A1 | 3/2006 | Pelaez et al. |
| 2006/0077926 A1 | 4/2006 | Rune |
| 2006/0078119 A1 | 4/2006 | Jee et al. |
| 2006/0136557 A1 | 6/2006 | Schaedler et al. |
| 2006/0161512 A1 | 7/2006 | Schaedler et al. |
| 2006/0172730 A1 | 8/2006 | Matsuda |
| 2006/0221972 A1 | 10/2006 | Bhargava et al. |
| 2006/0259759 A1 | 11/2006 | Maino et al. |
| 2006/0274744 A1 | 12/2006 | Nagai et al. |
| 2007/0121596 A1 | 5/2007 | Kurapati et al. |
| 2007/0242637 A1 | 10/2007 | Dynarski et al. |
| 2007/0297419 A1 | 12/2007 | Askerup et al. |
| 2008/0039104 A1 | 2/2008 | Gu et al. |
| 2009/0080440 A1 | 3/2009 | Balyan et al. |
| 2009/0129271 A1 | 5/2009 | Ramankutty et al. |
| 2009/0196231 A1 | 8/2009 | Giaretta et al. |
| 2009/0196290 A1 | 8/2009 | Zhao et al. |
| 2009/0232011 A1 | 9/2009 | Li et al. |
| 2009/0264097 A1 | 10/2009 | Cai et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0290392 A1 | 11/2010 | Rasanen et al. |
| 2010/0291923 A1* | 11/2010 | Zhou et al. ............ 455/432.1 |
| 2010/0299451 A1 | 11/2010 | Yigang et al. |
| 2010/0311392 A1 | 12/2010 | Stenfelt et al. |
| 2010/0331023 A1 | 12/2010 | Cai et al. |
| 2011/0116378 A1 | 5/2011 | Ramankutty et al. |
| 2011/0116382 A1 | 5/2011 | McCann et al. |
| 2011/0199906 A1 | 8/2011 | Kanode et al. |
| 2011/0200053 A1 | 8/2011 | Kanode et al. |
| 2011/0202612 A1 | 8/2011 | Craig et al. |
| 2011/0202614 A1 | 8/2011 | Craig et al. |
| 2011/0202676 A1 | 8/2011 | Craig et al. |
| 2011/0225113 A1 | 9/2011 | Mann |
| 2011/0225280 A1 | 9/2011 | Delsesto et al. |
| 2011/0225306 A1 | 9/2011 | Delsesto et al. |
| 2011/0282904 A1 | 11/2011 | Schaedler et al. |
| 2011/0302244 A1 | 12/2011 | McCann et al. |
| 2011/0314178 A1 | 12/2011 | Kanode et al. |
| 2012/0096177 A1 | 4/2012 | Rasanen |
| 2012/0124220 A1 | 5/2012 | Zhou et al. |
| 2012/0155389 A1 | 6/2012 | McNamee et al. |
| 2012/0155470 A1 | 6/2012 | McNamee et al. |
| 2012/0202550 A1 | 8/2012 | Marsico |
| 2012/0224524 A1 | 9/2012 | Marsico |
| 2012/0224531 A1 | 9/2012 | Karuturi et al. |
| 2012/0225679 A1 | 9/2012 | McCann et al. |
| 2012/0226758 A1 | 9/2012 | Sprague et al. |
| 2012/0226814 A1 | 9/2012 | Stucker |
| 2012/0239771 A1 | 9/2012 | Rasanen |
| 2012/0311064 A1 | 12/2012 | Deo |

FOREIGN PATENT DOCUMENTS

| | | | |
|---|---|---|---|
| EP | 2 220 841 B1 | 9/2011 | |
| EP | 1 846 832 B1 | 4/2012 | |
| WO | WO 2006/066149 A2 | 6/2006 | |
| WO | WO 2010/139360 A1 | 12/2010 | |
| WO | WO 2011/156274 A2 | 12/2011 | |
| WO | WO 2012/106710 A1 | 8/2012 | |
| WO | WO 2012/118959 A1 | 9/2012 | |
| WO | WO 2012/118963 A1 | 9/2012 | |
| WO | WO 2012/118967 A1 | 9/2012 | |
| WO | WO 2012/119147 A1 | 9/2012 | |
| WO | WO 2012/154674 A2 | 11/2012 | |

OTHER PUBLICATIONS

Non-Final Office Action for U.S. Appl. No. 13/192,410 (Dec. 20, 2012).

Non-Final Office Action for U.S. Appl. No. 13/409,893 (Dec. 13, 2012).

Commonly-assigned, co-pending U.S. Appl. No. 13/712,481 for "Methods, Systems, and Computer Readable Media for Encrypting Diameter Identification Information in a Communication Network," (Unpublished, filed Dec. 12, 2012).

Calhoun et al., "Diameter Base Protocol,"draft-ietf-aaa-diameter-07, Section 6.3, p. 68 (Jul. 2001).

Final Office Action for U.S. Appl. No. 13/409,893 (Jul. 1, 2013).

Non-Final Office Action for U.S. Appl. No. 12/409,914 (Jun. 7, 2013).

Notice of Allowance and Fee(s) Due for U.S. Appl. No. 13/412,352 (May 28, 2013).

Non-Final Office Action for U.S. Appl. No. 13/366,928 (Mar. 26, 2013).

Non-Final Office Action for U.S. Appl. No. 13/409,949 (Feb. 15, 2013).

Rouse, "Platform," http://searchservervirtualization.techtarget.com/definition/platform, pp. 1-2 (2006-2009).

Notification of Transmittal of the International Search Report and the Written Opinion of the International Searching Authority, or the Declaration for International Patent Application No. PCT/US2012/027281 (Jun. 15, 2012).

Notification of Transmittal of the International Search Report and the Written Opinion of the International Searching Authority, or the Declaration for International Application No. PCT/US2012/027263 (Jun. 14, 2012).

Notification of Transmittal of the International Search Report and the Written Opinion of the International Searching Authority, or the Declaration for International Patent Application No. PCT/US2012/027736 (Jun. 12, 2012).

Notification of Transmittal of the International Search Report and the Written Opinion of the International Searching Authority, or the Declaration for International Patent Application No. PCT/US2012/023971 (Jun. 11, 2012).

Notification of Transmittal of the International Search Report and the Written Opinion of the International Searching Authority, or the Declaration for International Patent Application No. PCT/US2012/027269 (Jun. 11, 2012).

Commonly-assigned, co-pending International Application No. PCT/US12/27736 for "Methods, Systems, and Computer Readable Media for Enriching a Diameter Signaling Message," (Unpublished, filed Mar. 5, 2012).

Commonly-assigned, co-pending U.S. Appl. No. 13/412,352 titled "Methods, Systems, and Computer Readable Media for Enriching a Diameter Signaling Message," (Unpublished, filed Mar. 5, 2012).

Commonly-assigned, co-pending International Application No. PCT/US12/27281 for "Methods, Systems, and Computer Readable Media for Hybrid Session Based Diameter Routing," (Unpublished, filed Mar. 1, 2012).

Commonly-assigned, co-pending U.S. Appl. No. 13/409,949 titled "Methods, Systems, and Computer Readable Media for Hybrid Session Based Diameter Routing," (Unpublished, filed Mar. 1, 2012).

Commonly-assigned, co-pending International Application No. PCT/US12/27269 for "Methods, Systems, and Computer Readable

(56) References Cited

OTHER PUBLICATIONS

Media for Dynamically Learning Diameter Binding Information," (Unpublished, filed Mar. 1, 2012).
Commonly-assigned, co-pending U.S. Appl. No. 13/409,914 titled "Methods, Systems, and Computer Readable Media for Dynamically Learning Diameter Binding Information," (Unpublished, filed Mar. 1, 2012).
Commonly-assigned, co-pending International Application No. PCT/US12/27263 for "Methods, Systems, and Computer Readable Media for Sharing Diameter Binding Data," (Unpublished, filed Mar. 1, 2012).
Commonly-assigned, co-pending U.S. Appl. No. 13/409,893 for "Methods, Systems, and Computer Readable Media for Sharing Diameter Binding Data," (Unpublished, filed Mar. 1, 2012).
Notification of Transmittal of the International Search Report and the Written Opinion of the International Searching Authority, or the Declaration for International Application No. PCT/US2011/039285 (Feb. 9, 2012).
Commonly-assigned, co-pending International Application No. PCT/US12/23971 for "Methods, Systems, and Computer Readable Media for Provisioning a Diameter Binding Repository," (Unpublished, filed Feb. 6, 2012).
Commonly-assigned, co-pending U.S. Appl. No. 13/366,928 titled "Methods, Systems, and Computer Readable Media for Provisioning a Diameter Binding Repository," (Unpublished, filed Feb. 6, 2012).
Notification of the Transmittal of the International Search Report and the Written Opinion of the International Searching Authority, or the Declaration for International Application No. PCT/US2010/061934 (Oct. 25, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207 V9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).
"3rd Generation Partnership Project; Technical Specification Group Services and System Aspects; Telecommunication management; Charging management; Charging architecture and principles (Release 9)," 3GPP TS 32.240, V9.1.0 (Jun. 2010).
Znaty, "Diameter, GPRS, (LTE + ePC = EPS), IMS, PCC and SDM," EFORT, pp. 1-229 (Part 1 of 2) (May 2010).
Znaty, "Diameter, GPRS, (LTE + ePC = EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
Olson et al., "Support for IPv6 in Session Description Protocol (SDP)," RFC 3266, pp. 1-5 (Jun. 2002).
Non-Final Official Action for U.S. Appl. No. 12/409,914 (Nov. 6, 2012).
Notification of Transmittal of the International Search Report and the Written Opinion of the International Searching Authority, or the Declaration for International Patent Application No. PCT/US2012/036784 (Nov. 1, 2012).
Non-Final Official Action for U.S. Appl. No. 13/412,352 (Oct. 26, 2012).
Communication of European publication number and information on the application of Article 67(3) EPC for European Patent Application No. 10841605.8 (Oct. 17, 2012).
Commonly-assigned, co-pending U.S. Appl. No. 13/465,552 for "Methods, Systems, and Computer Readable Media for Caching Call Session Control Function (CSCF) Data at the Diameter Signaling Router (DSR)," (Unpublished, filed May 7, 2012).
PCT International Patent Application No. PCT/US2012/036784, Titled, "Methods, Systems, and Computer Readable Media for Steering a Subscriber Between Access Networks," (Unpublished, Filed May 7, 2012).
Decision to grant a European patent pursuant to Article 97(1) EPC for European Application No. 05854512.0 (Mar. 15, 2012).
Communication under Rule 71(3) EPC for European application No. 05854512.0 (Nov. 11, 2011).
Notice of Allowance and Fee(s) Due for U.S. Appl. No. 11/303,757 (May 11, 2011).
Official Action for U.S. Appl No. 11/303,757 (Dec. 22, 2010)
3GPP, "3rd Generation Partnership Project; Technical Specification Group Core Networks and Terminals; Sh Interface based on the Diameter protocol; Protocol details (Release 8)," 3GPP TS 29.329, V8.8.0 (Dec. 2010).
Communication pursuant to Article 94(3) EPC for European Application No. 05 854 512.0 (Oct. 12, 2010).
Communication pursuant to Article 94(3) EPC for European Application No. 05854512.0 (Feb. 8, 2010).
Final Official Action for U.S. Appl. No. 11/303,757 (Dec. 9, 2009).
Supplementary European Search Report for European Application No. 05854512.0 (Nov. 17, 2009).
Official Action for U.S. Appl. No. 11/303,757 (May 28, 2009).
Final Official Action for U.S. Appl. No. 11/303,757 (Oct. 6, 2008).
Official Action for U.S. Appl. No. 11/303,757 (May 7, 2008).
Notification of Transmittal of the International Search Report and the Written Opinion corresponding to International Application No. PCT/US05/45813 (Mar. 24, 2008).
Official Action for U.S. Appl. No. 11/303,757 (Feb. 21, 2008).
Restriction Requirement for U.S. Appl. No. 11/303,757 (Oct. 4, 2007).
"Tekelec Announces TekCore IMS Core Platform," (Jun. 5, 2006).
"Operator Guidebook to IMS and New Generation Networks and Services," www.morianagroup.com, Second Edition (Feb. 2006).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
Gonzalo et al., "The 3G IP Multimedia Subsystem," Chapter 3: General Principles of the IMS Architecture (Aug. 20, 2004).
"IP Multimedia Subsystem IMS Over and Applications," 3G Americas, pp. 1-17 (Jul. 2004).

(56) References Cited

OTHER PUBLICATIONS

"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).

"All-IP Core Network Multimedia Domain," 3rd Generation Partnerships Project 2 (3GPP2), 3GPP2 X.S0013-000-0, Version 1.0, pp. i-ii and 1-14 (Dec. 2003).

"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).

"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).

Rosenberg et al., "SIP: Session Initiation Protocol," RFC 3261, pp. 1-252 (Jun. 2002).

Howard, "Sipping IETF51 3GPP Security and Authentication," http://www3.ietf.org/proceedings/01aug/slides/sipping-7/index.htm (Dowloaded from Internet on Dec. 16, 2005) (Sep. 13, 2001).

Narten et al., "Privacy Extensions for Stateless Address Autoconfiguration in IPv6," RFC 3041, pp. 1-16 (Jan. 2001).

Faltstrom, "E.164 Number and DNS," RFC 2916, pp. 1-10 (Sep. 2000).

Vaha-Sipila, "URLs for Telephone Calls," RFC 2806, pp. 1-20 (Apr. 2000).

Aboba et al., "The Network Access Identifier," RFC 2486, pp. 1-8 (Jan. 1999).

Calhoun et al., "Diameter Proxy Server Extensions," IETF Working Draft, draft-calhoun-diameter-proxy-01.txt (Aug. 1, 1998).

Berners-Lee et al., "Uniform Resource Identifiers (URI): Generic Syntax," RFC 2396, pp. 1-38 (Aug. 1998).

Tekelec, "Eagle® Feature Guide," P/N 910-1225-01 (Jan. 1998).

Jalava, "Service Routing in 3GPP IP Multimedia Subsystem," Nokia, pp. 1-16 (Publication Date Unknown).

3GPP, "$3^{rd}$ Generation Parnership Project; Technical Specification Group Core Network and Terminals; Policy and Charging Control Over Gx Reference Point (Release 9)," 3GPP TS 29.212 V9.2.0, pp. 1-111 (Mar. 2010).

Calhoun et al., "Diameter Base Protocol," Network Working Group, RFC 3588, pp. 1-138 (Sep. 2003).

* cited by examiner

US 8,615,237 B2

METHODS, SYSTEMS, AND COMPUTER READABLE MEDIA FOR POLICY AND CHARGING RULES FUNCTION (PCRF) NODE SELECTION

PRIORITY CLAIM

This application claims the benefit of U.S. Provisional Patent Application Ser. No. 61/292,062, filed Jan. 4, 2010 and U.S. Provisional Patent Application Ser. No. 61/405,629, filed Oct. 21, 2010; the disclosure of each of which is incorporated herein by reference in its entirety.

TECHNICAL FIELD

The subject matter described herein relates to identifying PCRF nodes in communications networks. More particularly, the subject matter described herein relates to PCRF node selection in a network with plural PCRFs and/or plural diameter relay agents (DRAs) or other nodes that perform PCRF node selection.

BACKGROUND

In communications networks, such as long term evolution (LTE) networks, the PCRF is the node that executes user policies that control aspects of a user's network services, such as authentication, authorization, bandwidth, other quality of service features, etc. A PCRF may obtain the policies for subscribers from another node referred to as a subscription profile repository (SPR), which may be co-located with a home subscriber server (HSS). The PCRF may communicate with a policy and charging enforcement function (PCEF), which enforces policies for subscriber terminals. When a user first communicates with a network, the user is assigned to a PCRF. Once a PCRF has been assigned, subsequent session related traffic for the user must be sent to the same PCRF because the PCRF stores policy state for the user. For example, the PCRF may store the volume of data accessed by the user while the user is attached to the network. The user's policy maintained by the PCRF may specify that the user's network access bandwidth is to be adjusted once the volume of accessed data reaches a threshold level. In order to manage such a policy, all traffic intended for the user during a particular network attachment must traverse the same PCRF.

More generally, when a node seeks to establish a session with the user, the node may contact the PCRF to request a particular level or quality of service for the session. The PCRF may execute the user's policy and respond to the request, indicating the quality of service that will be provided for the session. The PCRF may instruct the PCEF to enforce the policy as communicated to the requesting node.

Another function performed by the PCRF is charging. The PCRF may implement charging on a per packet flow basis. Packets matching filters of a particular policy rule are referred to as a service data flow (SDF). By identifying all packets associated with the same flow, the PCRF may charge for the flow in accordance with policy rules defined for the subscriber.

A DRA is responsible for routing or relaying Diameter signaling messages between Diameter nodes. In networks with very few Diameter nodes (such as PCRFs), there may be little need for a DRA. However, as the number of subscribers served by a network increases, it is necessary to scale the policy control functionality of the network and thus to add PCRFs and other Diameter nodes to the network. With plural PCRFs, it may be necessary to add plural DRAs to the network. While DRAs route Diameter signaling messages based on Diameter parameters, the base Diameter protocol specified in IETF RFC 3588 does not specify a methodology for selecting a PCRF in a network with plural PCRFs. As set forth above, there is a need to assign a PCRF to a user when the user first connects or attaches to the network and to ensure that subsequent session related traffic for the user is routed to the same PCRF. When there are plural DRAs and/or PCRFs in a network, optimally assigning subscribers to a PCRF and ensuring the proper routing of signaling after assignment has been made become important.

Accordingly, there exists a need for methods, systems, and computer readable media for PCRF node selection.

SUMMARY

The subject matter described herein includes methods, systems, and computer readable media for PCRF node selection. According to one aspect, a system for PCRF node selection is provided. The system includes a first PCRF selection node for receiving a first request message for which PCRF node selection is required. The first PCRF selection node determines whether to select the PCRF or to delegate selection of the PCRF. In response to a determination to delegate selection of the PCRF, the first PCRF selection generates and sends a second request message related to the first request message. The system further includes a second PCRF node for, in response to receiving the second request message from the first PCRF selection node, determining whether to select the PCRF or to delegate selection of the PCRF. In response to determining to select the PCRF, the second PCRF selection node selects the PCRF.

As used herein, the term "node" refers to a physical entity, such as a computing platform having one or more processors, memory, and one or more network interfaces.

The subject matter described herein for PCRF node selection may be implemented using a non-transitory computer readable medium having stored thereon executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be described with reference to the accompanying drawings of which.

DETAILED DESCRIPTION

Figure 1:
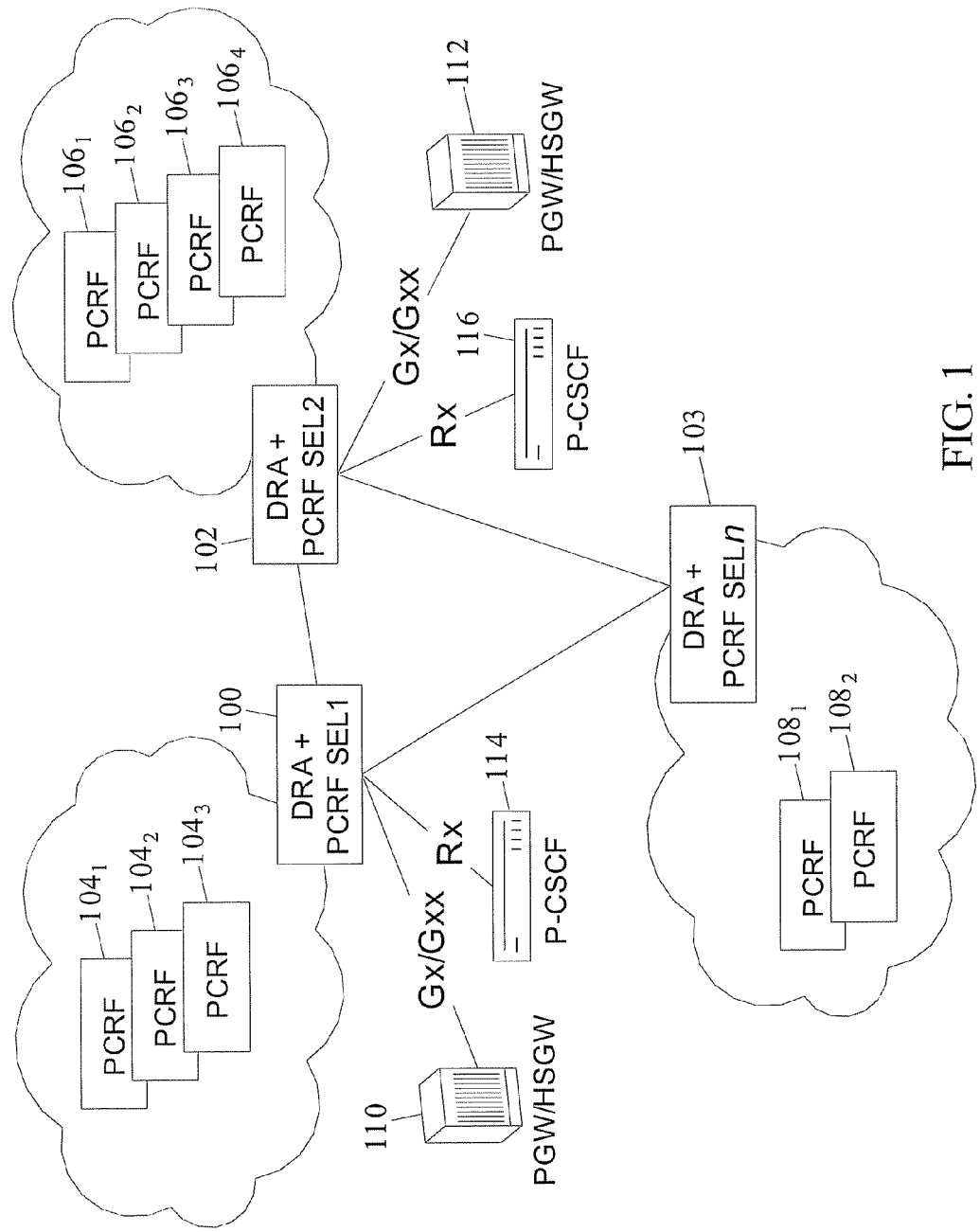
FIG. 1 is a network diagram illustrating an exemplary system for PCRF node selection according to an embodiment of the subject matter described herein.

Methods, systems, and computer readable media for PCRF node selection are provided. FIG. 1 is a block diagram illustrating an exemplary network including a system for PCRF node selection according to an embodiment of the subject matter described herein. Referring to FIG. 1, the network includes PCRF selection nodes 100, 102, and 103 that perform PCRF selection among PCRF nodes $104_1$-$104_3$, $106_1$-$106_4$, and $108_1$-$108_2$, respectively. Each PCRF is capable of executing policies for subscribers in a communications network, including wireless and/or wireline networks. An exemplary network for implementing the subject matter described herein is an LTE network. Each PCRF selection node 100, 102, and 103 include the ability to select and route signaling to the proper PCRF for a subscriber. In addition, each PCRF selection node 100, 102, and 103 may include DRA functionality.

The network illustrated in FIG. 1 further includes packet gateway/home service gateways (PGW/HSGWs) 110 and 112 and proxy call session control functions (P-CSCFs) 114 and 116. PGW/HSGWs 110 and 112 provide access network services to subscriber terminals. Without the subject matter described herein, PGW/HSGWs 110 and 112 would be required to be programmed with PCRF node selection functionality for all the PCRFs in the network. Thus, each time a new PCRF was added anywhere in the network, each PGW or HSGW would have to be updated. Such a solution is not scalable, as the number of PGWs and HSGWs in a network may be large. Accordingly, PCRF selection nodes 100, 102, and 103 shield PGW/HSGWs 110 and 112 and P-CSCFs 114 and 116 from having to communicate directly with PCRFs.

P-CSCFs 114 and 116 perform proxy call session control functions for subscriber terminals and communicate with PCRF selection nodes 100, 102, and 103 via Rx interfaces. The P-CSCF is the key element in an IMS network in that the P-CSCF handles signaling for voice over IP (VoIP) calls. One function that must be performed by each P-CSCF in establishing a VoIP call is to obtain authorization from a PCRF to connect the call. Rather than having every P-CSCF programmed to select a PCRF for a given call, the subject matter described herein allows the P-CSCF to offload the functionality of selecting a PCRF for a particular call to PCRF selection nodes 100, 102, and 103.

According to one embodiment of the subject matter described herein, a PCRF selection node may select a PCRF based on a subscriber identifier, such as an international mobile station identifier (IMSI). The IMSI-based approach is a static approach in that the same IMSI will always hash to the same PCRF. In this embodiment, it is assumed that the P-CSCFs 114 and 116 can provide a subscriber's IMSI over the Rx interfaces and that PGW/HSGWs 110 and 112 provide the IMSI over the Gx and Gxx interfaces so the same user identity will be used across all policy and charging control (PCC) client interfaces (Gx, Gxx, and Rx). Each PCRF selection node 100, 102, and 103 may be configured with the same IMSI hashing function to determine which PCRF selection node is performing the actual PCRF selection. The hashing algorithm used in selecting the PCRF selection node that performs PCRF selection may be a truncation algorithm where the last seven digits of the IMSI are truncated, leaving the first three digits. Using a truncation algorithm where predetermined digits of a subscriber or mobile station identifier are used to determine which node will perform the PCRF selection may allow delegation of PCRF node selection on a geographic basis. For example, subscribers within a particular geographic region may have IMSIs with the same first three digits. As a result, PCRF selection for these nodes may be performed by a PCRF selection node/DRA that serves that particular geographic region. The subject matter described herein is not limited to performing PCRF node selection based on the IMSI. Any subscriber identifier that appears on the Gx, Gxx, and Rx interfaces may be used. In alternate implementation, the subscriber's telephone number can be used.

During session establishment over the Gx, Gxx, or Rx interface, a PCRF selection node receiving an establishment request, will, based on the IMSI in the request and the hash algorithm, either process the request and identify the PCRF to which the request should be routed or delegate the PCRF selection function to another PCRF selection node responsible for the IMSI.

If the PCRF selection node that receives a request determines that it is responsible for PCRF selection based on hashing of the IMSI, the PCRF selection node will, in response to the signaling over the Gx or Gxx interface, whichever occurs first, select a PCRF in its region based on any suitable algorithm, such as a load balancing or node availability algorithm. The subject matter described herein is not limited to performing PCRF node selection using a load balancing or node availability algorithm. In an alternate implementation, a subscriber or mobile station identifier, such as the IMSI, can also be used to select a PCRF. For example, if the first three digits of the IMSI are used to select a PCRF selection node, some or all of the remaining digits of the IMSI may be used by the PCRF selection node to select the PCRF. The PCRF selection node may also maintain local state about the selected PCRF so that selection may only be required to occur once per attachment.

Once a PCRF selection node has selected a PCRF, subsequent session establishment requests will be routed to the assigned PCRF selection node based on the IMSI. The requests will then be routed by the assigned PCRF selection node to the selected PCRF based on the PCRF selection state maintained by the assigned PCRF selection node.

Session updates and terminations may be delivered to the assigned PCRF based on a combination of destination-realm and destination-host as per RFC 3588. The destination-host or destination-realm parameter in a message may contain the identity of the PCRF handling the session. If the destination-host or destination-realm parameter in a message contains Diameter routing information that allows a node to identify the PCRF assigned to a subscriber, these parameters may be used to route the message to the proper PCRF. Upon detachment (i.e., when all Gx and Gxx sessions for the subscriber are terminated), the PCRF selection node may remove local state about the selected PCRF.

Figure 2:
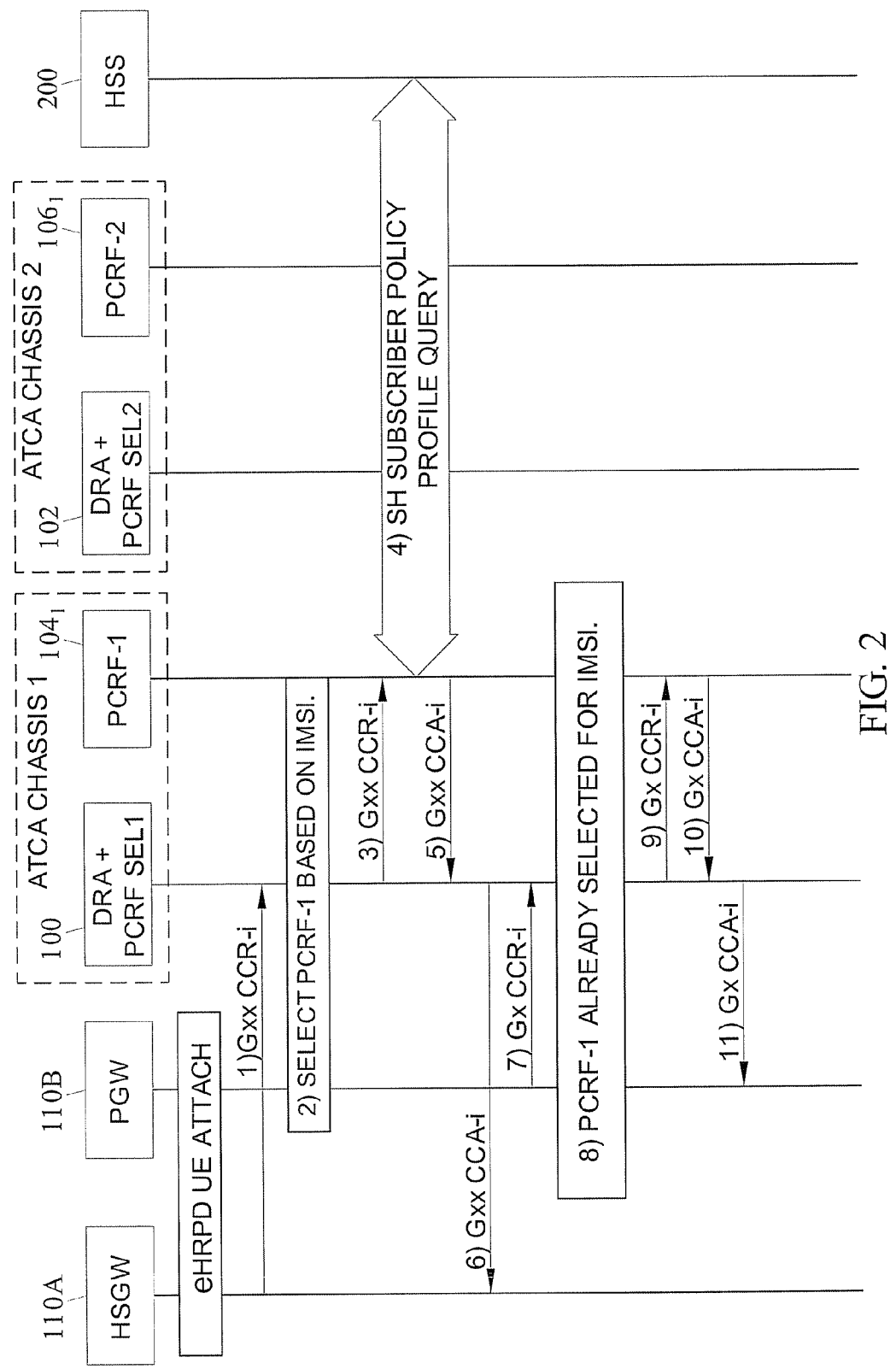
FIG. 2 is a message flow diagram illustrating exemplary messages that are exchanged for static PCRF node selection where a PCRF selection node locally performs PCRF node selection according to an embodiment of the subject matter described herein.

FIG. 2 is a message flow diagram illustrating static PCRF node selection where PCRF node selection is performed locally by a PCRF selection node in response to UE attachment to a network according to an embodiment of the subject matter described herein. Referring to FIG. 2, in line 1, a home service gateway (HSGW) 110A that serves a user terminal sends a Gxx credit control request (CCR) message to PCRF selection node 100. The CCR message may be generated by the HSGW in response to a user activating the user's mobile phone for the first time within an area served by a radio tower. In response to the user activating the user's mobile phone, the phone signals the radio tower. The radio tower signals HSGW 110A of the attachment. In the illustrated example, the core network to which the UE is attaching is assumed to be an LTE network. However, the access network components may not be LTE components. As such, the attachment procedure illustrated in FIG. 2 is an evolved high rate packet data (eHRPD) attachment. Using an eHRPD attachment allows operators to incrementally upgrade to LTE components. However, the subject matter described herein is not limited to performing PCRF node selection in response to a UE attachment procedure. The PCRF selection methods and systems described herein may also be used to perform PCRF node selection when the UE attaches to the network via an LTE node, such as an eNodeB.

Once attachment occurs, HSGW 110A needs to establish a Gxx session with a local PCRF. However, rather than contacting a PCRF directly, HSGW 110A signals PCRF selection node 100, which may be implemented by a DRA local to HSGW 110A. In line 2, PCRF selection node 100 performs a hash algorithm on the IMSI in the CCR message, determines that PCRF selection node 100 should be the node that selects the PCRF, and selects PCRF $104_1$, based on any suitable criteria, such as load balancing, node availability, and/or the IMSI. Accordingly, in line 3, PCRF selection node 100 sends a Gxx CCR message to PCRF $104_1$. In line 4, PCRF $104_1$ queries home subscriber server (HSS) 200 to obtain the subscriber's policy. In line 5, PCRF $104_1$ sends a credit control answer (CCA) message to PCRF selection node 100. In line 6, PCRF selection node 100 sends a Gx CCA message to HSGW 110A.

In line 7, packet gateway (PGW) 110B sends a CCR message over the Gx interface to PCRF selection node 100. PGW 110B may generate the CCR message to establish a Gx session for the subscriber with the assigned PCRF. However, rather than communicating directly with the assigned PCRF, PGW 110B, which does not know which PCRF has been assigned, contacts its local DRA/PCRF selection node 100. In line 8, PCRF selection node 100 determines that PCRF $104_1$ has already been selected for the IMSI in the CCR message and, in line 9, sends a CCR message to the selected PCRF $104_1$. In line 10, PCRF $104_1$ sends a Gx CCA message to PCRF selection node 100. In line 11, PCRF selection node 100 sends a Gx CCA message to packet gateway 110B.

Figure 3:
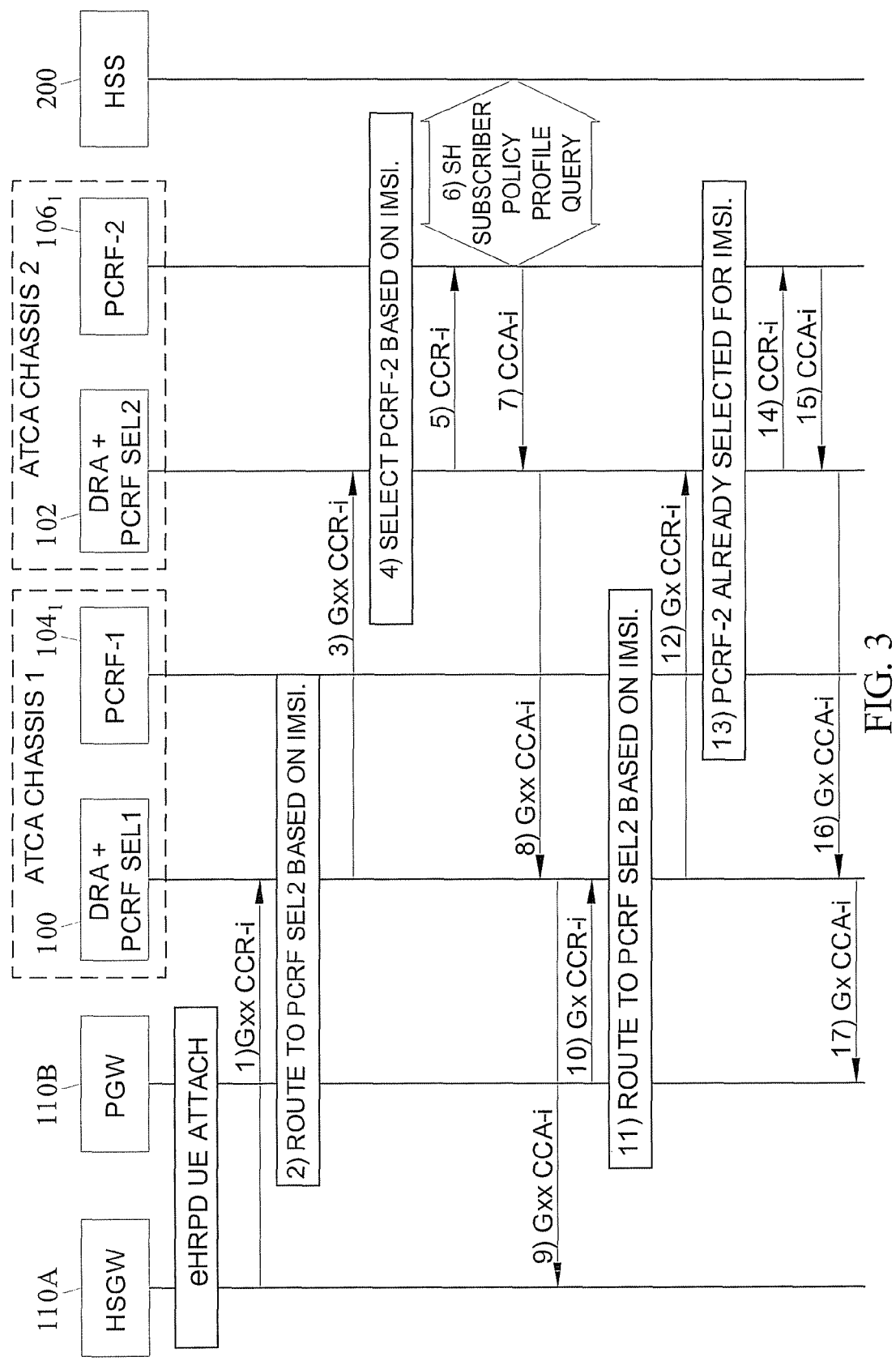
FIG. 3 is a message flow diagram illustrating exemplary messages exchanged for static PCRF node selection where selection of the PCRF is delegated from a first PCRF selection node to a second PCRF selection node according to an embodiment of the subject matter described herein.

FIG. 3 is a message flow diagram illustrating static PCRF selection where the PCRF selection is delegated according to an embodiment of the subject matter described herein. Referring to FIG. 3, when a UE attaches to the network, in line 1, HS gateway 110A sends a CCR message over the Gx interface to PCRF selection node 100. In line 2, PCRF selection node 100 performs a hash function on the IMSI in the CCR message and determines that PCRF selection node 100 is not the node that is assigned to select the PCRF. As set forth above, PCRF selection node 100 may determine that the subscriber's IMSI is local to another PCRF selection node. In this example, the PCRF selection node local to the IMSI (i.e., the subscriber's home PCRF selection node) is assumed to be PCRF selection node 102. Accordingly, PCRF selection node 100 sends a CCR message to PCRF selection node 102, delegating the PCRF node selection. In line 4, PCRF selection node 102 determines, based on the IMSI, that PCRF selection node 102 is the PCRF selection node assigned to select the PCRF and selects PCRF $106_1$, based on any suitable criteria, such as load balancing, node availability, and/or a subscriber identifier in the message. In line 5, PCRF selection node 102 sends a CCR message to the selected PCRF $106_1$. In line 6, PCRF $106_1$ obtains the subscriber's policy from HSS 200. In line 7, PCRF $106_1$ sends a CCA message to PCRF selection node 102. In line 8, PCRF selection node 102 sends a CCA message to PCRF selection node 100. In line 9, PCRF selection node 100 sends a CCA message to HS gateway 110A. The response CCA messages may follow the same paths as the corresponding requests using standard Diameter routing.

In line 10 of the message flow diagram, packet gateway 110B sends a CCR message to PCRF selection node 100 to initiate a Gx session for the subscriber. In line 11, PCRF selection node 100 performs the hash function based on the IMSI in the CCR message and determines that the CCR message should be routed to PCRF selection node 102. In line 12, PCRF selection node 100 sends a CCR message to PCRF selection node 102. In line 13, PCRF selection node 102 determines that PCRF $106_1$ has already been selected for the IMSI. Accordingly, in line 14, PORE selection node 102 sends a CCR message to the selected PCRF $106_1$. In line 15, PCRF $106_1$ sends a CCA message to PCRF selection node 102. In line 16, PCRF selection node 102 sends a CCA message to PCRF selection node 100. In line 17, PCRF selection node 100 sends a CCA message to packet gateway 110B.

Figure 4:
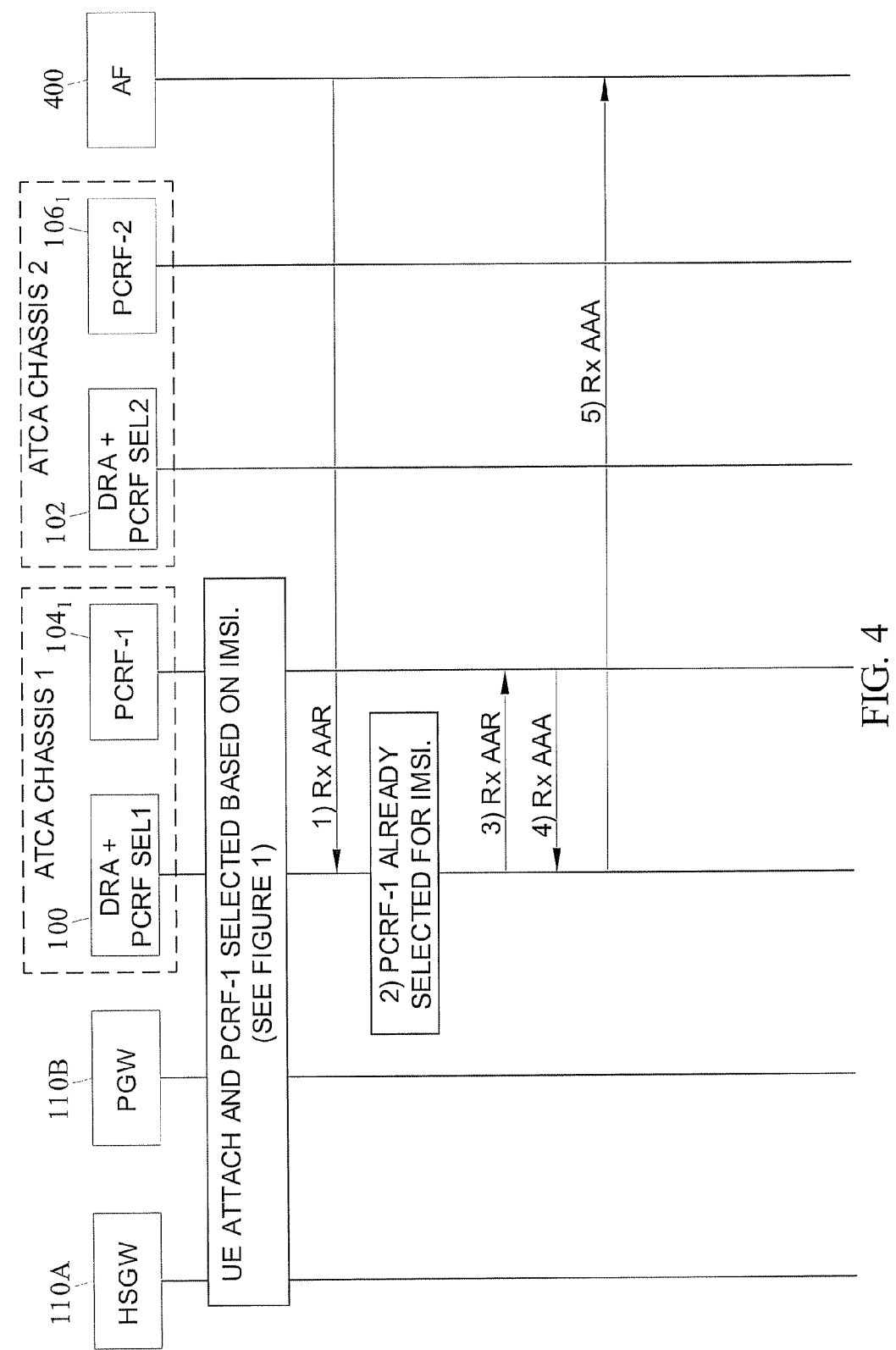
FIG. 4 is a message flow diagram illustrating static PCRF node selection where a PCRF selection node uses a previously selected PCRF node according to an embodiment of the subject matter described herein.

FIG. 4 is a message flow diagram illustrating exemplary messages exchanged for establishment of an application function (AF) session where a PORE was selected using the method illustrated in FIG. 2 according to an embodiment of the subject matter described herein. Referring to FIG. 4, it is assumed that a UE is attached to the network and that PCRF selection node 100 selected PCRF $104_1$ to serve the UE, as illustrated in FIG. 2. In line 1 of the message flow diagram illustrated in FIG. 4, an AF 400 sends an AA request (AAR) message to PCRF selection node 100 to establish an AF session with the PCRF assigned to the subscriber. AF 400 may be a web server, a video server, or a P-CSCE that seeks to establish a session with a user. Rather than communicating directly with a PCRF, application function 400 may communicate with its local DRA/PCRF selection node 100. In line 2, PCRF selection node 100 determines, using its stored PCRF selection state, that PCRF $104_1$ has already been selected for the IMSI received in the AAR message. Accordingly, in line 3, PCRF selection node 100 sends an AAR message over the Rx interface to PCRF $104_1$. In line 4, PCRF $104_1$ sends an AA answer (AAA) message to PCRF selection node 100 over the Rx interface. In line 5, PCRF selection node 100 sends an AAA message to AF 400 over the Rx interface.

Figure 5:
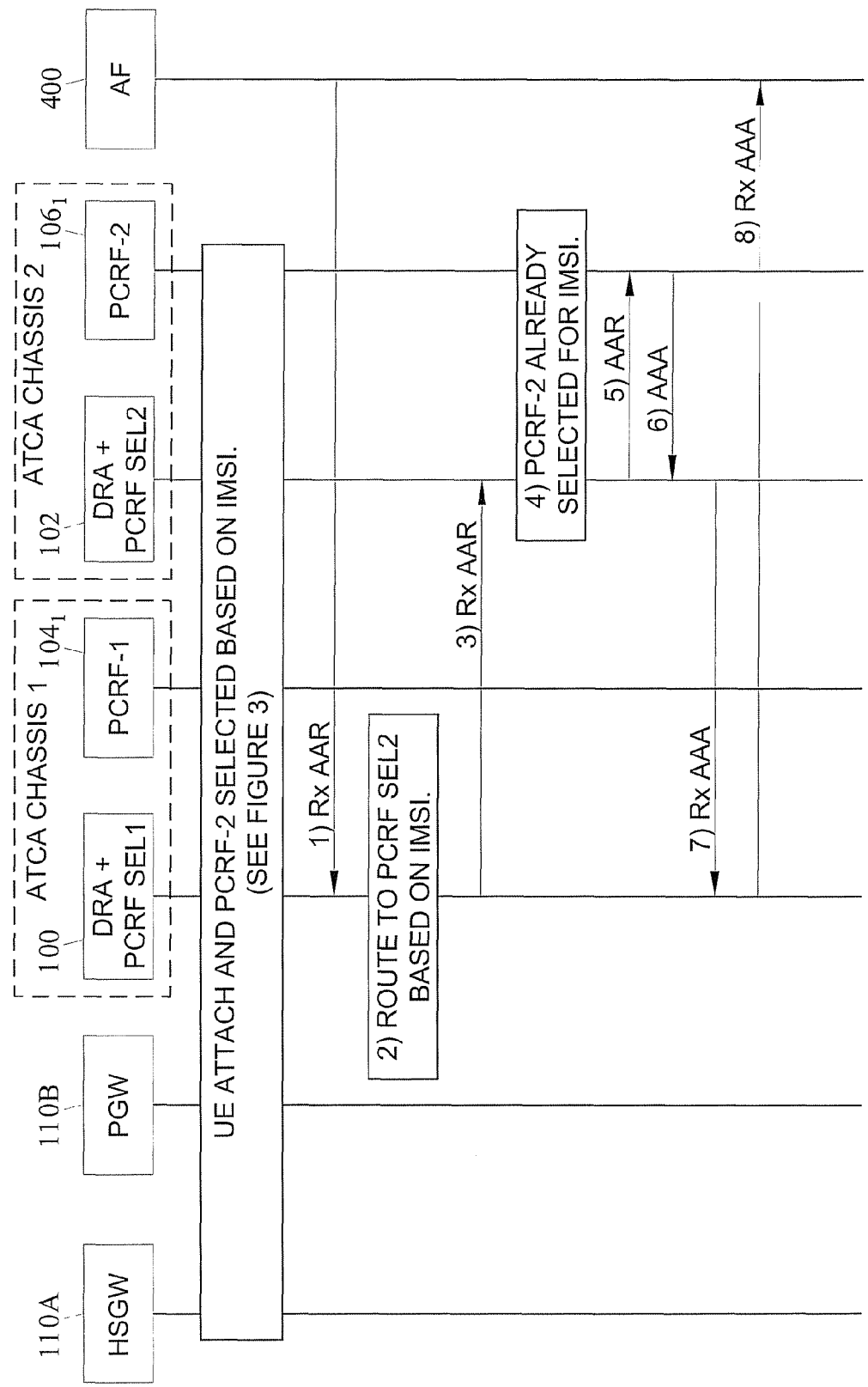
FIG. 5 is a message flow diagram illustrating static PCRF selection for an application function (AF) session where a PCRF selection node delegates PCRF selection according to an embodiment of the subject matter described herein.

FIG. 5 is a message flow diagram illustrating exemplary messaging for establishment of an AF session where PCRF selection was delegated during UE attachment. Referring to FIG. 5, it is assumed that PCRF selection node 102 select PCRF $106_1$ for the subscriber using the method illustrated in FIG. 3. In line 1 of the message flow diagram in FIG. 5, AF 400 sends an AAR message over the Rx interface to PCRF selection node 100 to initiate the AF session. PCRF selection node 100 does not store PCRF selection state because PCRF selection node 100 did not select the PCRF for this particular subscriber. Accordingly, in line 2, PCRF selection node 100 determines that the AAR message should be routed to PCRF selection node 102 based on the IMSI in the AAR message. In line 3, PCRF selection node 100 sends an AAR message over the Rx interface to PCRF selection node 102. PCRF selection node 102 is the node that performs the PCRF selection and stores PCRF selection state for the IMSI. Accordingly, in line 4 of the message flow diagram, PCRF selection node 102 determines that PCRF $106_1$ has already been selected for the IMSI. In line 5, PCRF selection node 102 sends an AAR message to the selected PCRF $106_1$. In line 6, PCRF $106_1$ sends an AAA message to PCRF selection node 102. In line 7, PCRF selection node 102 sends an AAA message to PCRF selection node 100. In line 8, PCRF selection node 100 sends an AAA message to AF 400.

According to another embodiment of the subject matter described herein, dynamic PCRF node selection is provided. According to dynamic PCRF selection, the node that performs PCRF node selection is determined based on dynamic criteria, such as load balancing and/or node availability, rather than based on static criteria, such as the IMSI. Once a PCRF selection node has been assigned and has selected a PCRF, the PCRF selection node may store its identity and/or the identity of the selected PCRF in a database node, such as an HSS. Other PCRF selection nodes can retrieve the selected PCRF information from the database node. According to this embodiment, during session establishment over the Gx, Gxx, or Rx interfaces, a PCRF selection node that receives a session establishment request will determine whether the receiving PCRF selection node or another PCRF selection node will be responsible for selecting the PCRF handling the session. In contrast to the static embodiment described above where the decision as to whether to select the PCRF locally or delegate the selection is based on static criteria, in this embodiment, the determination as to whether to perform such delegation may be based on dynamic criteria, such as load balancing and/or node availability. In such an embodiment, assignment of a PCRF selection node and/or a PCRF based on home or geographic indicators associated with a subscriber identifier may be avoided. Instead, the selection of a PCRF selection node to perform the PCRF node selection and selection of the corresponding PCRF may be done based on domains of responsibility that may be assigned by the network operator.

If a PCRF selection node that receives a session establishment request has already selected a PCRF for the user, it will route the request to the selected PCRF. Otherwise, it will query the HSS or other database to determine if a PCRF has already been selected. If the result of the query indicates that a PCRF has already been selected, the PCRF selection node will route the request to the PCRF via the PCRF's DRA/ PCRF selection node. If a PCRF was not previously selected, the PCRF selection node will dynamically determine (e.g., using load balancing and/or node availability information) a PCRF selection node that will be responsible for PCRF selection and will route the request to that node. The request to the receiving PCRF selection node may include a token or parameter that indicates to the receiving PCRF selection node that it is the last node in a hierarchy of PCRF selection nodes and that the PCRF selection node should perform, rather than delegate, the PCRF selection. The PCRF selection node that receives the request will select the PCRF and write the HSS or other database its identity and optionally the identity of the selected PCRF. The PCRF selection node that performed the selection may store the identity of the selected PCRF locally to shield the HSS or other database from subsequent queries to determine the assigned PCRF.

As stated above, a PCRF selection node may perform PCRF selection within its domain of responsibility using a load balancing and/or node availability algorithm. The PCRF selection node may maintain local state about the local PCRF to minimize interaction with the HSS. Session updates and terminations may be delivered to the proper PCRF based on a combination of destination-realm and destination-host, as specified in RFC 3588. The destination-host parameter in a message may contain the identity of the PCRF handling this session. Upon detachment (i.e., when all Gx and Gxx session for subscriber are terminated) the PCRF selection node may delete the selected PCRF and/or DRA/PCRF selection node data in the HSS and remove the corresponding local state.

Figure 6:
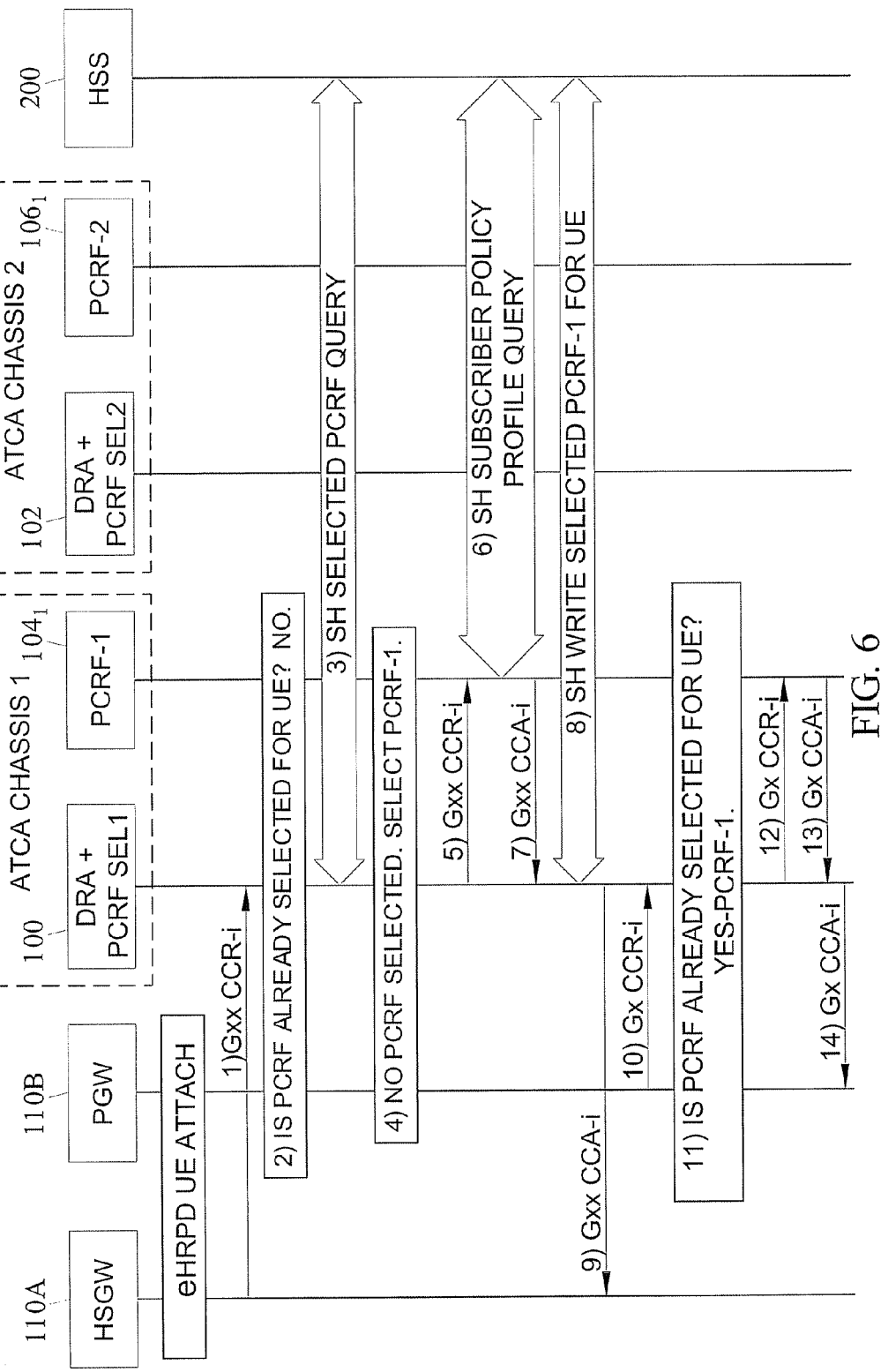
FIG. 6 is a message flow diagram illustrating dynamic PCRF node selection where a PCRF is selected locally by a PCRF selection node according to an embodiment of the subject matter described herein.

FIG. 6 is a message flow diagram illustrating dynamic PCRF selection where a PCRF is selected locally by a DRA/ PCRF selection node that receives a Diameter session establishment request in response to user attachment to a network according to an embodiment of the subject matter described herein. Referring to FIG. 6, it is assumed that user equipment attaches to the network and, in line 1, HS gateway 110A sends a CCR message over the Gxx interface to PCRF selection node 100 to initiate establishment of a Gxx session for the user. PCRF selection node 100 determines in line 2 that it does not store information indicating that a PCRF has been selected for the UE. Accordingly, in line 3, PCRF selection node 100 queries HSS 200 to determine whether a PCRF has been selected. As set forth above, the subject matter described herein is not limited to storing PCRF selection state in an HSS. Any suitable centralized database accessible by DRA/ PCRF selection nodes to store and access PCRF selection information is intended to be within the scope of the subject matter described herein. In an alternate implementation, which will be described in detail below, PCRF selection state may be maintained by a node that is dedicated to storing PCRF selection state, referred to as a subscription binding repository (SBR). In the embodiment illustrated in FIG. 6, it is assumed that once PCRF selection has occurred, the selection state is stored in HSS 200.

In line 4, PCRF selection node 100 determines that no PCRF has been selected, so PCRF selection node 100 dynamically determines that PCRF selection node 100 is the PCRF selection node responsible for selecting the PCRF and selects PCRF selection node $104_1$. As set forth above, the determination as to whether to perform PCRF selection locally may be based on dynamic criteria, such as load balancing and/or node availability. Other dynamic criteria that may be used may include PCRF selection delegation token in a message received from another DRA/PCRF selection node.

In line 5, PCRF selection node 100 sends a CCR message to the selected PCRF $104_1$ over the Gxx interface. In line 6, the selected PCRF $104_1$ queries HSS 200 to obtain a policy for the subscriber. In line 7, PCRF node $104_1$ sends a CCA message to PCRF selection node 100 over the Gxx interface. In line 8, PCRF selection node 100 writes the identifier of the selected PCRF for the user equipment to HSS 200. As set forth above, it may not be necessary for the identifier of selected PCRF to be written to the HSS. In an alternate implementation, only the identifier of the PCRF selection node/DRA that performs the selection may be written to the HSS. Since the PCRF selection node/DRA that performs the selection stores the PCRF selection state, subsequent queries to the HSS will yield the PCRF selection node/DRA, and the PCRF selection node/DRA will route the signaling to the proper PCRF. In line 9, PCRF selection node 100 sends a CCA message to HS gateway 110A. In line 10, packet gateway 110B sends a CCR message to PCRF selection node 100 to establish a Gx session for the UE. In line 11, PCRF selection node 100 determines whether a PCRF has already been selected by PCRF selection node 100 for the UE. Because PCRF $104_1$ has already been selected by PCRF selection node 100, in line 12, PCRF selection node 100 sends a CCR message to PCRF $104_1$ over the Gx interface. In line 13, PCRF $104_1$ sends a CCA message to PCRF selection node 100 over the Gx interface. In line 14, PCRF selection node 100 sends a Gx CCA message to packet gateway 110B.

Figure 7A:
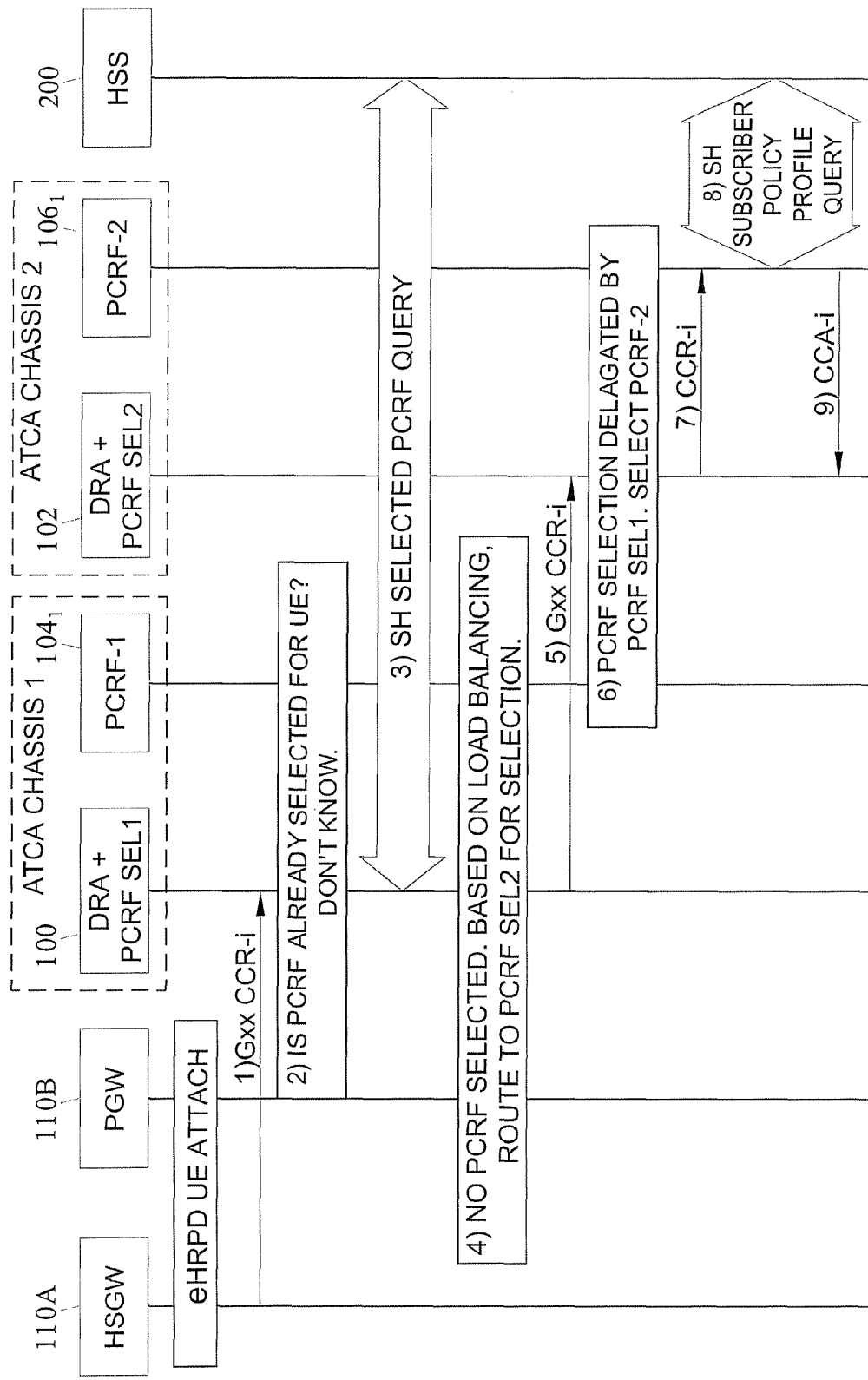
FIGS. 7A and 7B are a message flow diagram illustrating dynamic PCRF selection where PCRF selection is delegated according to an embodiment of the subject matter described herein.
Figure 7B:
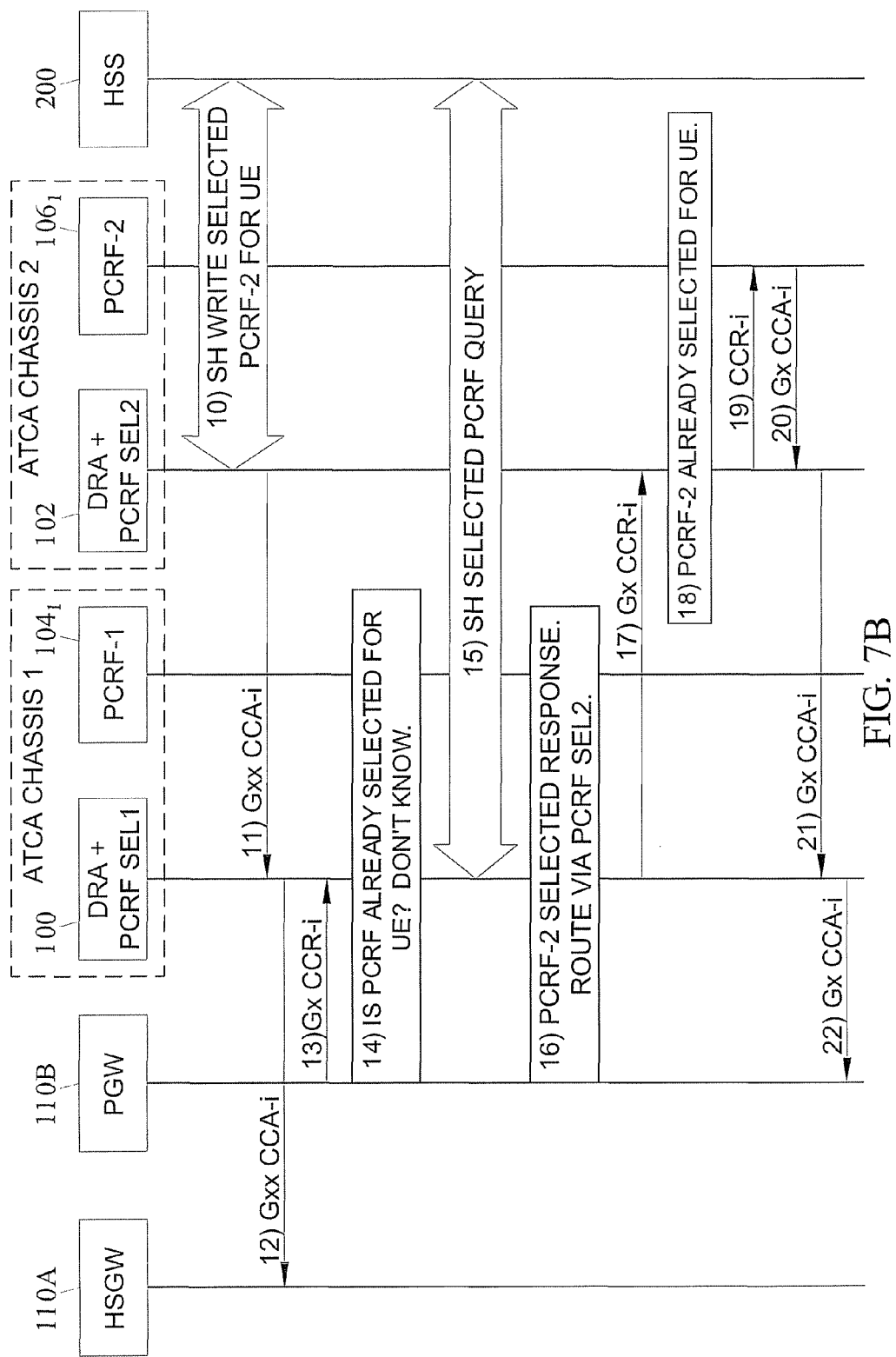

FIGS. 7A and 7B are a message flow diagram illustrating exemplary messages exchanged for dynamic PCRF selection where PCRF selection is delegated from one PCRF selection node/DRA to another PCRF selection node/DRA according to an embodiment of the subject matter described herein. Referring to FIG. 7A, it is assumed that a UE attaches to the network via an access network within the domain of responsibility of HSGW 110A. According, in line 1, HS gateway 110A sends a CCR message to PCRF selection node 100 via the Gxx interface to establish a Gx session for the UE. In line 2, PCRF selection node 100 determines whether PCRF selection node 100 has information that indicates that a PCRF has been selected for a session. No information is determined to be present in this example, so in line 3, PCRF selection node 100 queries HSS 200 to determine whether a PCRF has been assigned. In line 4, PCRF selection node 100 determines, based on the response from HSS 200, that no PCRF has been selected. Accordingly, PCRF selection node 100 performs a load balancing or other suitable algorithm and selects PCRF selection node 102 to perform the PCRF selection. Accordingly, in line 5, PCRF selection node 100 sends a CCR message to PCRF selection node 102. As set forth above, the CCR message may include a PCRF selection delegation token that indicates to PCRF selection node 102 that PCRF selection node 102 is to perform the PCRF selection, rather than delegate the PCRF selection to another node. In line 6, PCRF selection node 102 performs PCRF selection using a load balancing or other suitable algorithm to select PCRF node $106_1$. In line 7, PCRF selection node 102 sends a CCR message to the selected PCRF $106_1$. In line 8, PCRF $106_1$ queries HSS 200 to obtain a policy for the subscriber.

Referring to FIG. 7B, in line 10, PCRF selection node 102 writes the identity of the selected PCRF and/or the identity of PCRF selection node 102 to HSS 200. In line 11, PCRF selection node 102 sends a CCA message to PCRF selection node 100 over the Gxx interface. In line 12, PCRF selection node sends a CCA message to HS gateway 110A over the Gxx interface.

In line 13, PGW 110B sends a CCR message to PCRF selection node 100 to establish a Gx session for the UE. In line 14, PCRF selection node 100 determines whether a PCRF has already been selected for this session. In this example, PCRF selection node 100 does not know whether a PCRF has been selected, because PCRF selection node 100 did not perform the selection and store the selection state locally. Accordingly, PCRF selection node 100 sends a PCRF selection query to HSS 200. In line 16, PCRF selection node 100 determines, from the response from the HSS 200, that PCRF $106_1$ is selected and determines that the CCR message should be routed to PCRF $106_1$ via PCRF selection node 102. In line 17, PCRF selection node 100 sends a CCR message to PCRF selection node 102 via the Gx interface. In line 18, PCRF selection node 102 determines, using locally stored PCRF selection state, that PCRF $106_1$ has already been selected for the UE. Accordingly, in line 19, PCRF selection node 102 sends a CCR message to the selected PCRF $106_1$. In line 20, PCRF $106_1$ sends a CCA message to PCRF selection node 102 over the Gx interface. In line 21, PCRF selection node 102 sends a CCA message to PCRF selection node 100 over the Gx interface. In line 22, PCRF selection node 100 sends a CCA message to PGW 110B over the Gx interface.

Figure 8:
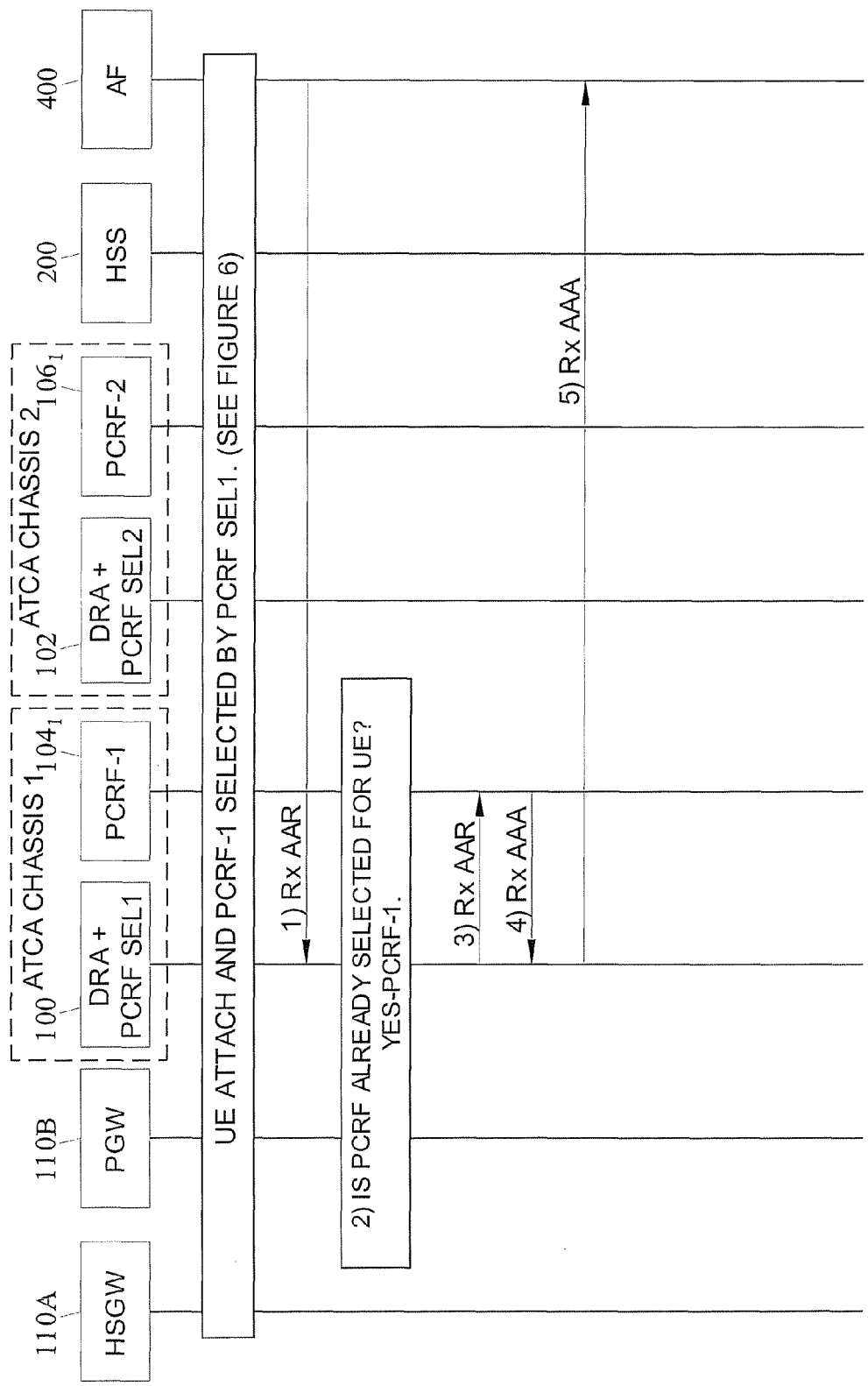
FIG. 8 is a message flow diagram illustrating exemplary messages exchanged for dynamic PCRF selection for an AF session where a PCRF selection node selects a previously selected PCRF according to an embodiment of the subject matter described herein.

FIG. 8 is a message flow diagram illustrating assignment of PCRF to an AF session where the PCRF was previously dynamically selected using the method illustrated in FIG. 6 according to an embodiment of the subject matter described herein. Referring to FIG. 8, it is assumed that a UE has attached to the network and PCRF $104_1$ has been selected by PCRF selection node 100, as illustrated in FIG. 6. In line 1 of FIG. 8, AF 400 sends an AAR message to PCRF selection node 100. In line 2, PCRF selection node 100 determines, using locally stored PCRF selection state, that PCRF $104_1$ has already been selected for this session. Accordingly, in line 3, PCRF selection node 100 sends an AAR message over the Rx interface to the selected PCRF $104_1$. In line 4, PCRF $104_1$ sends an AAA message over the Rx interface to PCRF selection node 100. In line 5, PCRF selection node 100 sends an AAA message to application function 400.

Figure 9:
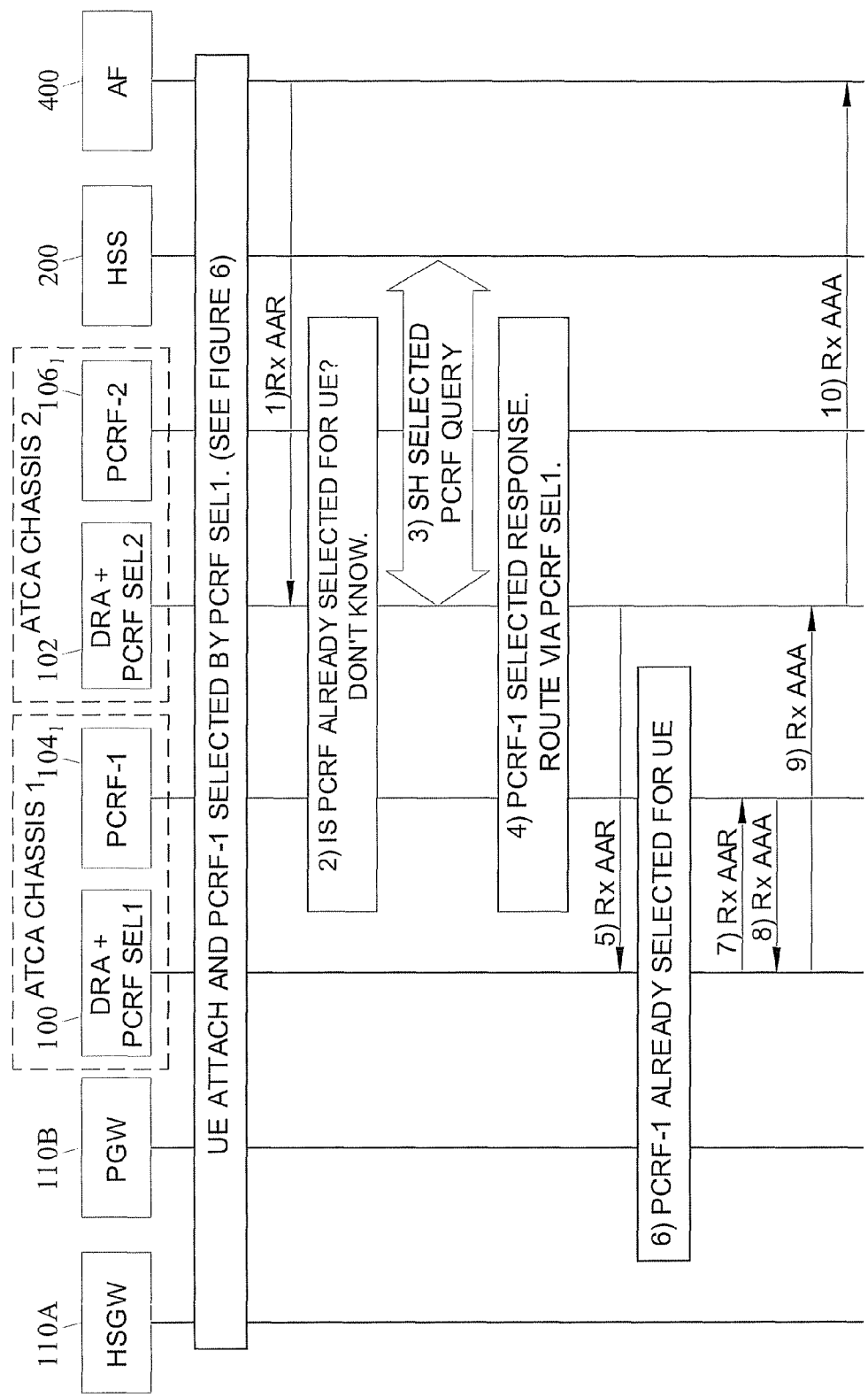
FIG. 9 is a message flow diagram illustrating dynamic PCRF selection for an AF session where a PCRF selection node delegates PCRF selection according to an embodiment of the subject matter described herein.

FIG. 9 is a message flow diagram illustrating assignment of PCRF to an AF session where the PCRF was previously dynamically selected using the method illustrated in FIG. 6. However, unlike the example illustrated in FIG. 8, the PCRF selection node that receives the initial AAR message in FIG. 9 is not the PCRF selection node that performed the PCRF selection. In FIG. 9, it is assumed that a PCRF $104_1$ and PCRF selection node 100 have been selected using the method set forth in FIG. 6. Accordingly, in line 1, AF 400 sends an AAR message to PCRF selection node 102. In line 2, PCRF selection node 102 determines that PCRF selection node 102 does not have any local state information indicating that a PCRF selection has occurred. Accordingly, in line 3, PCRF selection node 102 queries HSS 200 for the selected PCRF information. In line 4, PCRF selection node 102 determines that PCRF $104_1$ has been selected and that the request should be routed to PCRF $104_1$ via PCRF selection node 100. In line 5, PCRF selection node 102 sends an AAR message to PCRF selection node 100. In line 6, PCRF selection node 100 determines, using locally stored PCRF selection state, that PCRF $104_1$ is already selected for the UE. In line 7, PCRF selection node 100 sends an AAR message to PCRF $104_1$. In line 8, PCRF $104_1$ sends an AAA message to PCRF selection node 100. In line 9, PCRF selection node 100 sends an AAR message to PCRF selection node 102. In line 10, PCRF selection node 102 sends an AAA message to AF 400.

Figure 10:
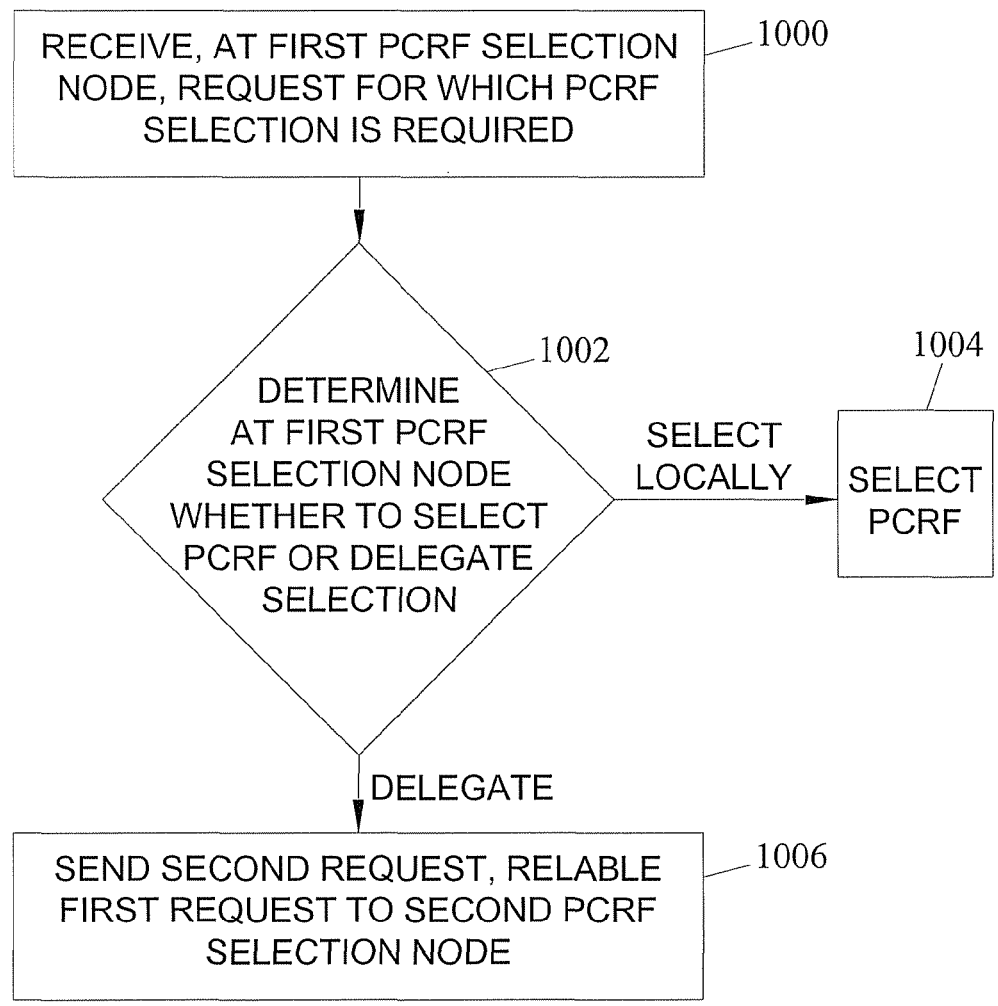
FIG. 10 is a flow chart illustrating exemplary steps for PCRF node selection according to an embodiment of the subject matter described herein.

FIG. 10 is a flow chart illustrating exemplary overall steps for PCRF node selection according to an embodiment of the subject matter described herein. Referring to FIG. 10, in step 1000, a request for which PCRF node selection is required is received at a first PCRF selection node. In step 1002, the first PCRF selection node determines whether to select the PCRF locally or to delegate the selection. If the first PCRF selection node determines to select the PCRF locally, control proceeds to step 1004 where the first PCRF selection node selects the PCRF locally. The determination as to whether to select the PCRF locally or to delegate the PCRF selection may be determined statically, using the IMSI, as described above, or dynamically, based on dynamic criteria, as described above.

Returning to step 1002, if the first PCRF selection node determines to delegate the PCRF selection, control proceeds to step 1006 where the first PCRF selection node sends a second request message related to the first request message to a second PCRF selection node. The second PCRF node may execute the same algorithm illustrated in FIG. 10 to determine whether it should select the PCRF or delegate the selection.

Figure 11:
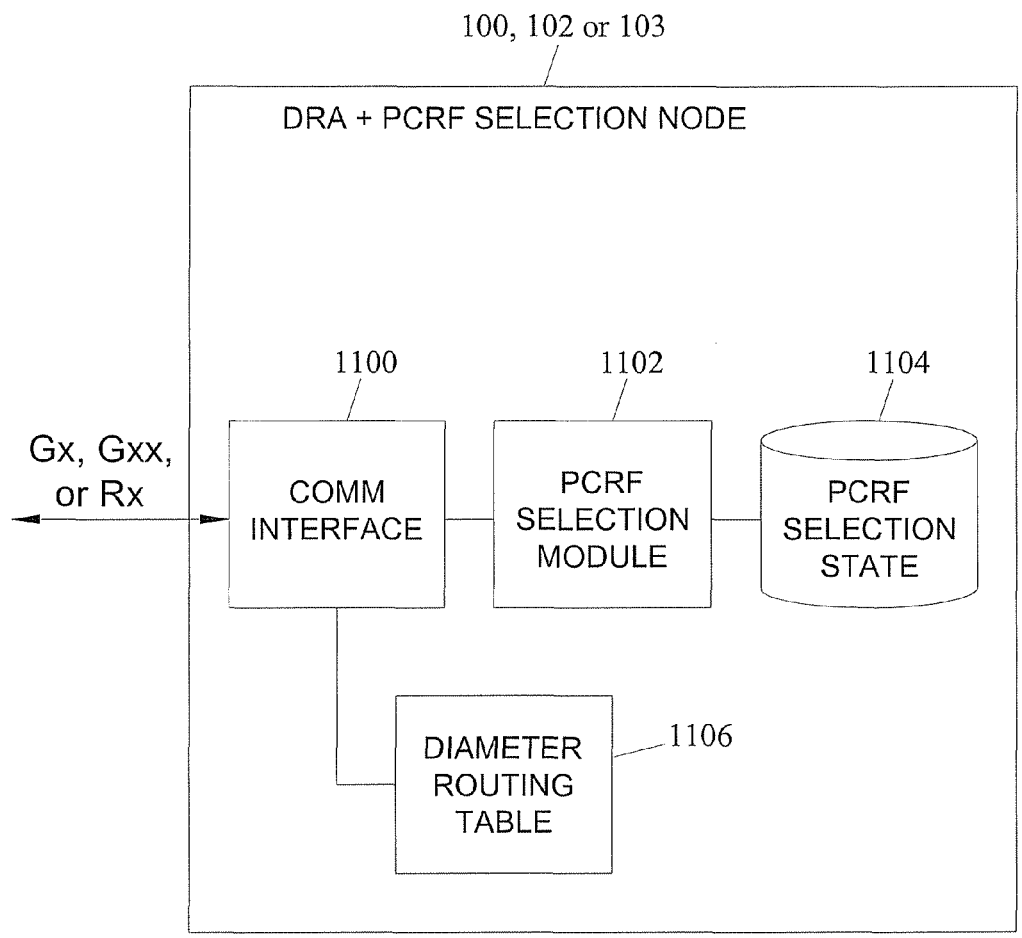
FIG. 11 is a block diagram of an exemplary PCRF selection node according to an embodiment of the subject matter described herein.

FIG. 11 is block diagram illustrating an exemplary PCRF selection node according to an embodiment of the subject matter described herein. Referring to FIG. 11, PCRF selection node 100, 102, or 103 includes a communications interface 1100 for receiving request messages for which PCRF selection is indicated. The request messages may be CCR message and they may arrive over any suitable interface, such as the Gx or the Gxx interfaces. For application originated sessions, the messages may be AAR messages that arrive over the Rx interface. PCRF selection node 100, 102, or 103 may include a PCRF selection module 1102 that performs local or delegates PCRF selection as described above. PCRF selection nodes 100, 102, or 103 may also store PCRF selection state information 1104 to avoid unnecessary contact with HSS nodes to obtain PCRF selection information. As set forth above, PCRF selection node 100, 102, or 103 may be dedicated to performing PCRF node selection or may include diameter routing agent (DRA) functionality. As such, PCRF selection node 100, 102, or 103 may include a Diameter routing table 1106 that contains information for routing diameter signaling messages sent by Diameter parameters, such as destination-realm and destination-host.

Figure 12:
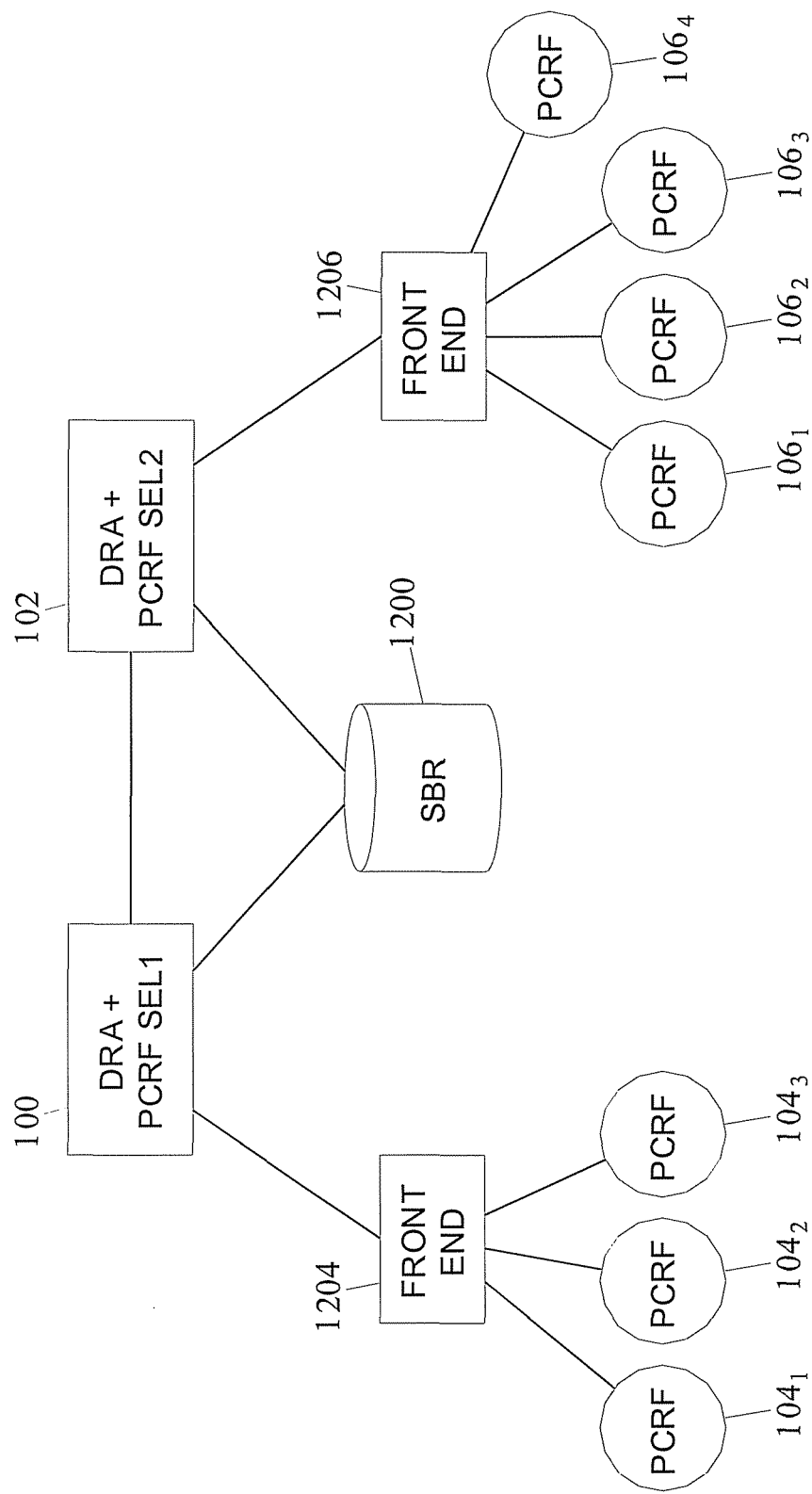
FIG. 12 is a network diagram where PCRF selection state is maintained by a subscription binding repository (SBR) according to an embodiment of the subject matter described herein.

FIG. 12 illustrates an embodiment of the subject matter described herein where PCRF selection state information is stored in a database separate from the HSS and from the DRA. Referring to FIG. 12, a node that is dedicated to storing PCRF selection state, referred to as a subscription binding repository (SBR) 1200, stores PCRF selection state information. SBR 1200 can be updated with PCRF selection state using any of the methods used herein. For example, PCRF selection nodes 100 or 102 can select the PCRF statically based on the IMSI, as described above or dynamically, using load balancing, as described above. The PCRF selection state may be written to SBR 1200. In an alternate implementation, PCRF selection nodes 100 and 102 may select one of front end nodes 1204 and 1206, and front end nodes 1204 and 1206 may perform the PCRF selection based on load balancing or other suitable criteria. Front end nodes 1204 and 1206 may be dedicated to performing PCRF node selection. Alternatively, front end nodes 1204 and 1206 may also include DRA functionality, similar to PCRF selection nodes 100 and 102. Once a PCRF is selected, that information will be stored in SBR 1200. Storing PCRF selection information in SBR 1200 allows SBR 1200 to be queried to obtain PCRF selection state and further offloads traffic and processing from the HSS and the DRA. In addition, SBRs may be arranged in a hierarchy such that each SBR stores PCRF selection state for its domain of responsibility and forwards PCRF-related queries requests to peers when an SBR does not have the selection state to provide in response to a query but knows of a peer SBR that might have the PCRF selection state.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for a policy and charging rules function (PCRF) node selection, the system comprising:
    a first PCRF selection node for receiving a first request message for which PCRF node selection is required; for determining whether to select a PCRF node or to delegate selection of the PCRF node; and, in response to determining to delegate selection of the PCRF node, for generating and sending a second request message based on the first request message; and
    a second PCRF selection node for, in response to receiving the second request message from the first PCRF selection node, determining whether to select the PCRF node; and, in response to determining to select the PCRF node, for selecting the PCRF node, wherein the second PCRF selection node, in response to selecting the PCRF node, writes information indicating at least one of: an identity of the selected PCRF and an identity of the second PCRF selection node to a database node, wherein the database node comprises a subscription binding repository (SBR), and wherein the SBR is configured as part of an SBR hierarchy for providing PCRF selection information in response to queries for PCRFs within a domain of responsibility of the SBR.

2. The system of claim 1 wherein the first PCRF selection node determines whether to select the PCRF node based on a subscriber identifier in the first request message.

3. The system of claim 2 wherein the first PCRF selection node performs a hash function of the subscriber identifier to determine whether to select the PCRF node.

4. The system of claim 2 wherein the first PCRF selection node determines whether to select the PCRF node based on dynamic criteria.

5. The system of claim 4 wherein the dynamic criteria include at least one of load balancing criteria and node availability criteria.

6. The system of claim 1 wherein the second PCRF selection node selects the PCRF node using at least one of: load balancing criteria and node availability criteria.

7. The system of claim 1 wherein the database node comprises a home subscriber server (HSS).

8. The system of claim 1 wherein the SBR is configured for forwarding SBR queries to other SBRs in the SBR hierarchy when the queries request information outside of the domain of responsibility of the SBR.

9. The system of claim 1 wherein the second PCRF selection node determines to select the PCRF node based on a token present in the second request message.

10. The system of claim 1 wherein the first and second PCRF selection nodes are dedicated to performing PCRF node selection.

11. The system of claim 1 wherein the first and second PCRF selection nodes each include diameter relay agent (DRA) functionality.

12. A method for policy and charging rules function (PCRF) node selection, the method comprising:
    at a first PCRF selection node:
        receiving a first request message for which PCRF node selection is required;
        determining whether to select a PCRF node or to delegate selection of the PCRF node; and
        in response to determining to delegate selection of the PCRF node, generating and sending a second request message based on the first request message; and
    at a second PCRF selection node:

in response to receiving the second request message from the first PCRF selection node;

determining whether to select the PCRF node; and in response to determining to select the PCRF node, for selecting the PCRF node, wherein the second PCRF selection node, in response to selecting the PCRF node, writes information indicating at least one of: an identity of the selected PCRF and an identity of the second PCRF selection node to a database node, wherein the database node comprises a subscription binding repository (SBR), and wherein the SBR is configured as part of an SBR hierarchy for providing PCRF selection information in response to queries for PCRFs within a domain of responsibility of the SBR.

13. The method of claim 12 wherein the first PCRF selection node determines whether to select the PCRF node based on a subscriber identifier in the first request message.

14. The method of claim 13 wherein the first PCRF selection node performs a hash function of the subscriber identifier to determine whether to select the PCRF node.

15. The method of claim 12 wherein the first PCRF selection node determines whether to select the PCRF node based on dynamic criteria.

16. The method of claim 15 wherein the dynamic criteria include at least one of load balancing criteria and node availability criteria.

17. The method of claim 12 wherein the second PCRF selection node selects the PCRF node using at least one of: load balancing criteria and node availability criteria.

18. The method of claim 12 wherein the database node comprises a home subscriber server (HSS).

19. The method of claim 12 wherein the SBR is configured for forwarding SBR queries to other SBRs in the SBR hierarchy when the queries request information outside of the domain of responsibility of the SBR.

20. The method of claim 12 wherein the second PCRF selection node determines to select the PCRF node based on a token present in the second request message.

21. The method of claim 12 wherein the first and second PCRF selection nodes are dedicated to performing PCRF node selection.

22. The method of claim 12 wherein the first and second PCRF selection nodes each include diameter relay agent (DRA) functionality.

23. A non-transitory computer readable medium having stored thereon executable instructions that when executed by the processor of a computer control the computer to perform steps comprising:

at a first PCRF selection node:

receiving a first request message for which PCRF node selection is required;

determining whether to select a PCRF node or to delegate selection of the PCRF node; and in response to determining to delegate selection of the PCRF node, generating and sending a second request message based on the first request message; and at a second PCRF selection node:

in response to receiving the second request message from the first PCRF selection node;

determining whether to select the PCRF node; and in response to determining to select the PCRF node, for selecting the PCRF node, wherein the second PCRF selection node, in response to selecting the PCRF node, writes information indicating at least one of: an identity of the selected PCRF and an identity of the second PCRF selection node to a database node, wherein the database node comprises a subscription binding repository (SBR), and wherein the SBR is configured as part of an SBR hierarchy for providing PCRF selection information in response to queries for PCRFs within a domain of responsibility of the SBR.

* * * * *